(12) United States Patent
Alisafaee et al.

(10) Patent No.: US 10,502,385 B2
(45) Date of Patent: Dec. 10, 2019

(54) DYNAMIC REFLECTOR SYSTEM AND SEGMENTED REFLECTOR OF THE DYNAMIC REFLECTOR SYSTEM

(71) Applicant: Grote Industries, LLC, Madison, IN (US)

(72) Inventors: Hossein Alisafaee, Madison, IN (US); Aditya Peri, Madison, IN (US); Cesar Perez-Bolivar, Madison, IN (US)

(73) Assignee: Grote Industries, LLC, Madison, IN (US)

( * ) Notice: Subject to any disclaimer, the term of this patent is extended or adjusted under 35 U.S.C. 154(b) by 14 days.

(21) Appl. No.: 15/688,069

(22) Filed: Aug. 28, 2017

(65) Prior Publication Data

US 2018/0058653 A1    Mar. 1, 2018

Related U.S. Application Data

(60) Provisional application No. 62/380,533, filed on Aug. 29, 2016.

(51) Int. Cl.
| | |
|---|---|
| *F21S 41/675* | (2018.01) |
| *F21V 17/02* | (2006.01) |
| *F21S 43/00* | (2018.01) |

(52) U.S. Cl.
CPC .......... *F21S 41/675* (2018.01); *F21S 43/00* (2018.01); *F21V 17/02* (2013.01)

(58) Field of Classification Search
USPC ........................................... 362/466
See application file for complete search history.

(56) References Cited

U.S. PATENT DOCUMENTS

| | | | | |
|---|---|---|---|---|
| 2007/0217193 A1* | 9/2007 | Lin | ....................... | F21V 7/0008 362/245 |
| 2013/0258688 A1* | 10/2013 | Kalapodas | ............. | B60Q 1/085 362/465 |
| 2015/0247616 A1* | 9/2015 | Albrecht | ............... | F21V 7/0008 362/235 |

* cited by examiner

*Primary Examiner* — Rafferty D Kelly
(74) *Attorney, Agent, or Firm* — Posz Law Group, PLC

(57) ABSTRACT

A dynamic segmented-reflector for a vehicle headlamp that includes a light source and a substrate formed as a reflector sidewall. The reflector sidewall includes reflector facets that are grown on the reflector sidewall. The reflector facets include at least one mirrored surface that faces the light source, and the reflector facets are configured to adjust position to form different light patterns.

7 Claims, 9 Drawing Sheets

DYNAMIC REFLECTOR SYSTEM AND SEGMENTED REFLECTOR OF THE DYNAMIC REFLECTOR SYSTEM

CROSS-REFERENCE TO RELATED APPLICATION

This application claims the benefit of U.S. Provisional Application No. 62/380,533 filed Aug. 29, 2016, which is expressly incorporated herein by reference.

TECHNICAL FIELD

This disclosure relates to a dynamic reflector system and method that adjusts a reflector to form various light patterns, and a dynamic segmented-reflector associated with the dynamic reflector system. In particular, the disclosure relates to a dynamic reflector system for a headlamp of a motor vehicle.

BACKGROUND

Typically, a conventional headlamp is designed to project only a single light pattern using an associated light source and a reflector, such as a low beam pattern or a high beam pattern. Other light patterns may include a fog beam pattern, a turn signal pattern, and a daytime running light pattern. Thus, a vehicle can include at least five separate sections in a headlamp and/or separate headlamps in order to produce each of the five light patterns.

One of the reasons conventional headlamps can only produce a single light pattern is because conventional headlamps do not typically include moving parts (i.e., dynamic). Instead, conventional headlamps are fixed (i.e., static) and/or the associated reflectors are fixed, and thus unadaptable to different situations. This limitation results in several shortcomings of conventional headlamps.

For example, when a driver travels down a dark road with a conventional headlamp system, the driver may activate a high beam pattern in order to better illuminate the road. However, if a driver forgets to manually turn off the high beams, the vehicle's high beams become a hazard for oncoming traffic. This is because a high beam pattern of a conventional vehicle headlamp characteristically projects light above the horizon, which is within a driver's viewpoint.

Alternatively, conventional headlamps may also include matrix light emitting diodes ("LEDs") to form different light patterns using only the matrix LED itself. However, conventional headlamps with matrix LEDs are also fixed (i.e., static), and thus subject to similar limitations as other conventional headlamps. In addition to those limitations, conventional headlamps also require a relatively large number of LEDs, which negatively affects costs. Furthermore, conventional headlamps that include matrix LEDs may require complete replacement if one of the LEDs within the matrix fails.

Another issue with fixed configurations is the inability to compensate for slight defects or imperfections due to manufacturing or age deterioration. Despite great advances in manufacturing capabilities, there will always be a certain number of defective units in a manufacturing lot. When a defective static-headlamp is produced, the defective headlamp may emit a light pattern that fails to conform to safety standards.

Similarly, a conventional low beam headlamp may emit light above the horizon and into a driver's viewpoint due to normal wear and tear. Note that a conventional low beam headlamp cannot self-adjust to correct this problem, since conventional headlamps are fixed.

SUMMARY

A reflector for a vehicle headlamp is provided that includes a reflector sidewall substrate that outwardly extends from a center portion to form an exterior edge; a light source that is located adjacent to the outer edge of the reflector sidewall and that emits light toward the reflector sidewall; and a plurality of reflector facets that outwardly extend from the reflector sidewall substrate, that include at least one mirrored surface that faces the light source, that are configured to reflect light to form a plurality of patterns, and that are configured to adjust to form the plurality of light patterns.

The reflector may also include in some embodiments a controller electrically that is connected to at least one of the reflector sidewall substrate and the plurality of reflector facets and that is configured to adjust the plurality of reflector facets to form a different light pattern of the plurality of light patterns.

The reflector may also include in some embodiments a light sensor connected to the controller that is configured to detect light from oncoming traffic and transmit a detected oncoming traffic signal to the controller in response to detecting the light from oncoming traffic. The controller may be further configured to actuate the plurality of reflector facets to form a first light pattern and actuate the plurality of reflector facets to form a spread light pattern arrangement in response to the detected oncoming traffic signal of the light sensor.

The controller may be configured to actuate the plurality of reflector facets to form a first light pattern and actuate the plurality of reflector facets to switch from a first light pattern to a second light pattern different from the first light pattern.

The controller is configured to actuate the plurality of reflectors to form at least one of a high beam pattern, a low beam pattern, a fog beam pattern, a turn signal patter, and a daytime running lamp pattern.

A method for controlling a dynamic reflector is provided that includes adjusting a plurality of reflector facets grown on a reflector sidewall substrate of a dynamic segmented-reflector to form a first light pattern arrangement of the plurality of reflector facets, and adjusting the plurality of reflector facets grown on the reflector sidewall substrate of the dynamic segmented-reflector to form a second light pattern arrangement of the plurality of reflector facets different from the first light pattern arrangement.

A method for controlling a dynamic reflector is provided that includes adjusting an arrangement of a plurality of reflector facets grown on a reflector sidewall substrate of a dynamic segmented-reflector to form a first light pattern arrangement; detecting oncoming traffic via a light sensor; transmitting a signal to a controller that indicates the detection of oncoming traffic in response to the detection of oncoming traffic; and adjusting the arrangement of the plurality of reflector facets grown on the reflector sidewall substrate of the dynamic segmented-reflector to form a second light pattern arrangement different from the first light pattern arrangement that spreads emitted light of the dynamic segmented-reflector away from oncoming traffic.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention. These drawings are not necessarily drawn to scale.

DETAILED DESCRIPTION

Figure 1:
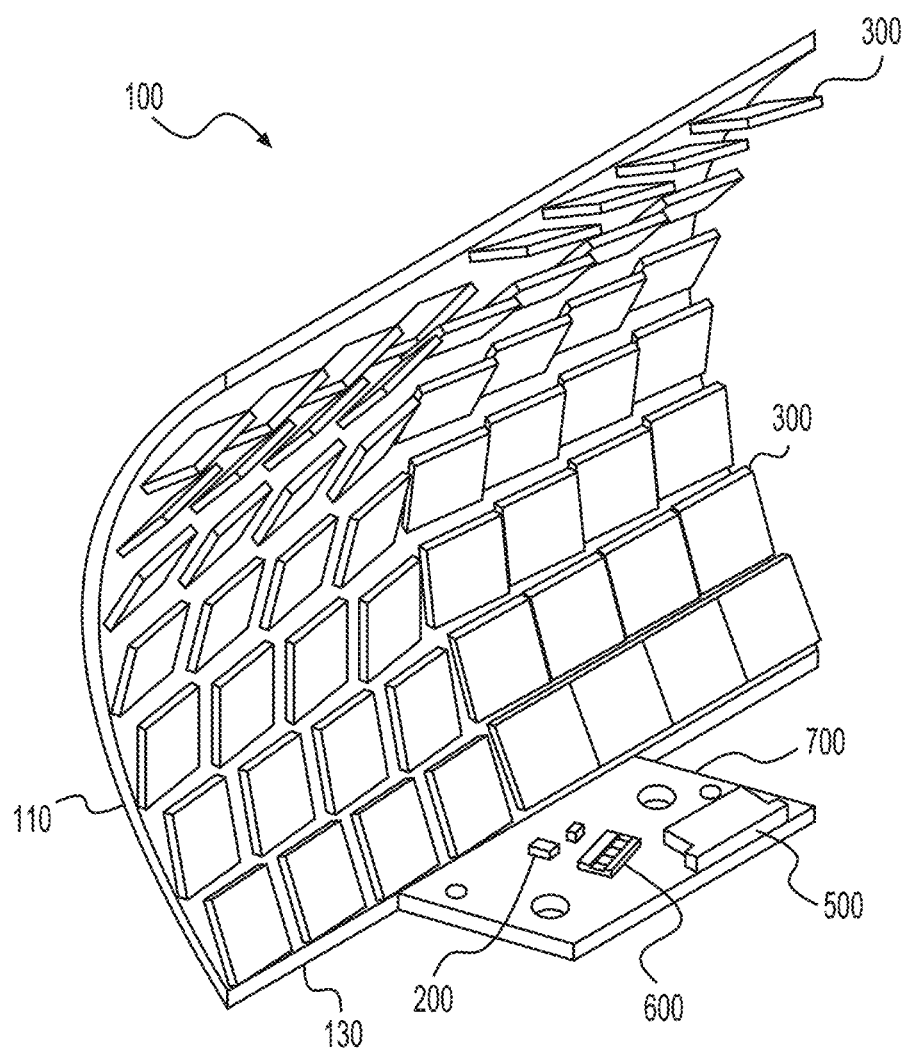
FIG. 1 is a perspective view of the dynamic segmented-reflector system according to the disclosed embodiments.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order (i.e., processes or steps that are not so limited may be performed in any order).

Overview

The dynamic reflector system of the present disclosure is configured to include a dynamic segmented-reflector 100 that forms different light patterns. Specifically, the dynamic segmented-reflector 100 includes a plurality of reflector facets 300 that dynamically move in order to form different light patterns. The dynamic segmented-reflector 100 adjusts to different positions in different situations or in response to different stimuli (i.e., signals). In other words, the dynamic reflector system relates to a smart headlamp.

The dynamic segmented-reflector 100 can form the at least two light patterns typically implemented in a vehicle headlamp: a low beam pattern and a high beam pattern. However, the dynamic segmented-reflector 100 of the present disclosure can form more than the two basic light patterns. For example, the dynamic segmented-reflector 100 can also form turn signal patterns, fog lamp patterns, and daytime running lamp patterns. These typical light patterns will be understood by one skilled in the art.

The dynamic segmented-reflector 100 can form new light patterns in addition to the typical light patterns discussed above. For example, the dynamic segmented-reflector 100 can form a spread-high-beam pattern that illuminates above the horizon (such as a high beam pattern), and spreads (e.g., splits) the light from reflecting onto oncoming traffic at the same time. Thus, the spread-high-beam pattern of the dynamic segmented-reflector 100 provides additional luminesce while reducing, or eliminating, glare towards oncoming traffic.

In addition, the dynamic segmented-reflector 100 can form entertaining patterns when the car is not being driven. For example, when a driver pulls into her garage and turns off her car, the dynamic segmented-reflector 100 may briefly display an emoticon (e.g., a smiling face). Alternatively, the dynamic segmented-reflector 100 may display a logo or trademark, such as the trademark of the vehicle's manufacturer, as the driver parks her vehicle.

Reflector Sidewall Substrate

Figure 2:
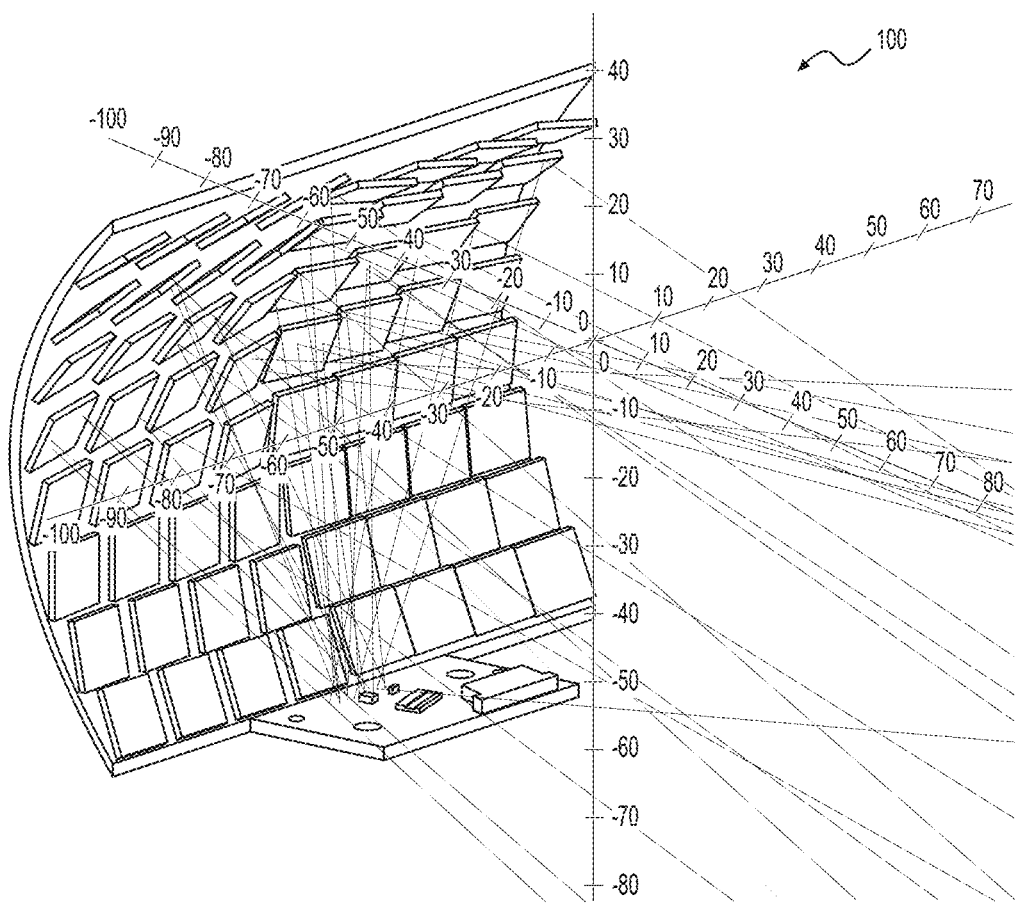
FIG. 2 is a perspective view of the dynamic segmented-reflector showing light pattern formation according to the disclosed embodiments.

FIGS. 1 and 2 show a perspective view of the dynamic reflector system of the present disclosure. FIG. 1 shows the dynamic segmented-reflector 100 includes a reflector sidewall substrate 110 and a plurality of reflector facets 300. The reflector sidewall substrate 100 is a substrate on which the plurality of reflector facets 300 are grown. Thus, the reflector sidewall substrate 110 and the plurality of reflector facets 300 are a type of microelectromechanical system ("MEMS"), as will be understood by one skilled in the art. The reflector sidewall substrate 100 may be referred to as a reflector sidewall. The dynamic reflector system also includes a light source 200 that emits light towards the dynamic segmented-reflector 100.

FIG. 2 shows how the dynamic segmented-reflector 100 directs the light emitted from the light source 200. Specifically, the light source 200 emits lights toward the dynamic segmented-reflector 100. When the light emitted from the light source 200 reaches the dynamic segmented-reflector 100, the plurality of reflector facets 300 outwardly reflect the light beyond the light source 200.

Figure 3:
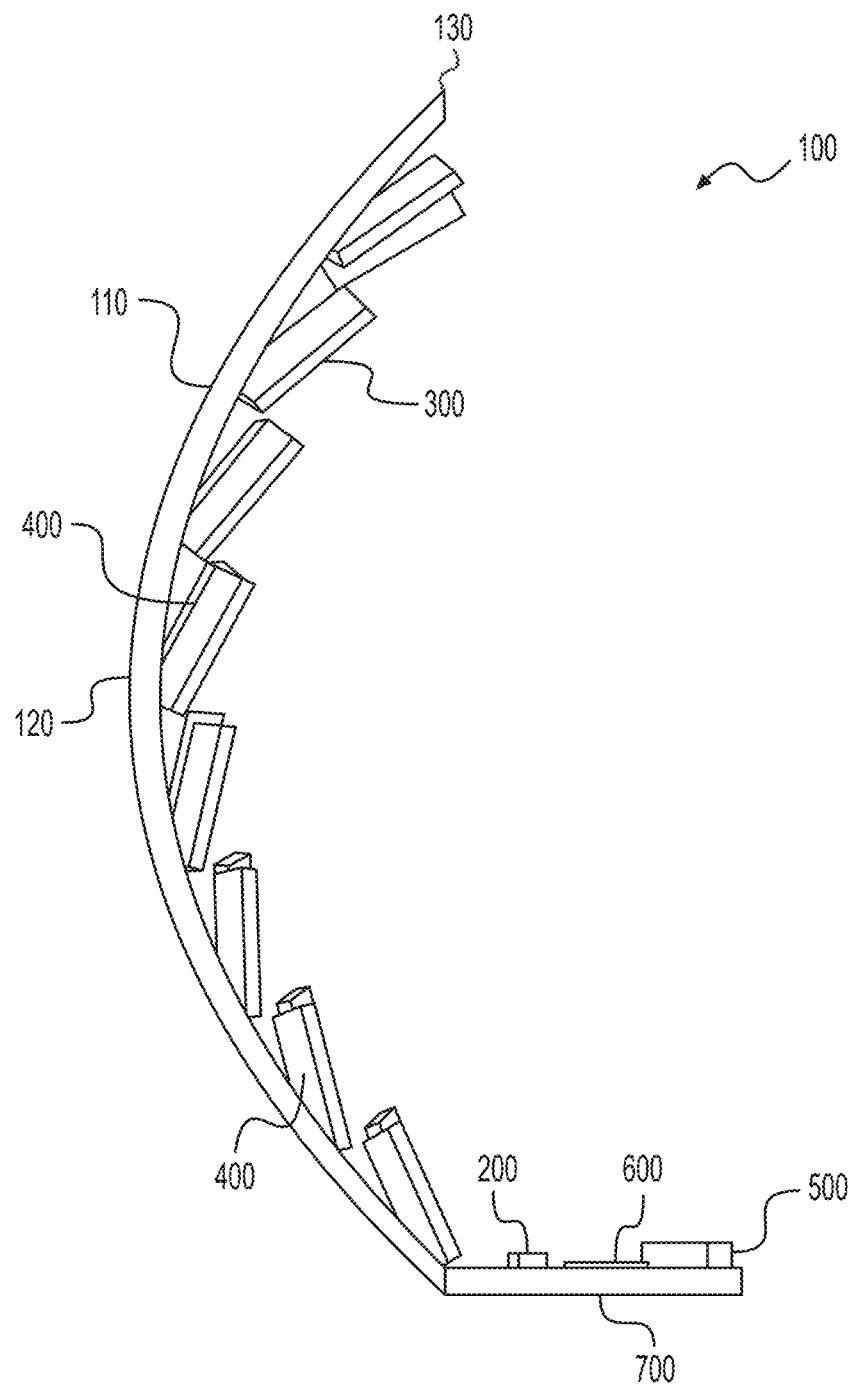
FIG. 3 is a side view of the dynamic segmented-reflector system according to the disclosed embodiments.

FIG. 3 shows a side view of the dynamic reflector system. As shown in FIG. 3, the reflector sidewall substrate 110 of the dynamic segmented-reflector 100 extends from a center portion 120. The reflector sidewall substrate 110 extends from the center portion 120 to form an exterior edge 130. FIG. 2 shows a reflector sidewall substrate 110 with four exterior edges 130 that are respectively perpendicular to each other in order to form a rectangle.

However, the reflector sidewall substrate 110 may be shaped in any configuration. For example, the reflector sidewall substrate 110 may be shaped as a circle or a parabola with a single exterior edge 130 that extends around an outer surface of the reflector sidewall substrate 110. Alternatively, the reflector sidewall substrate 110 may be a flat sidewall or a curved sidewall.

Figure 4:
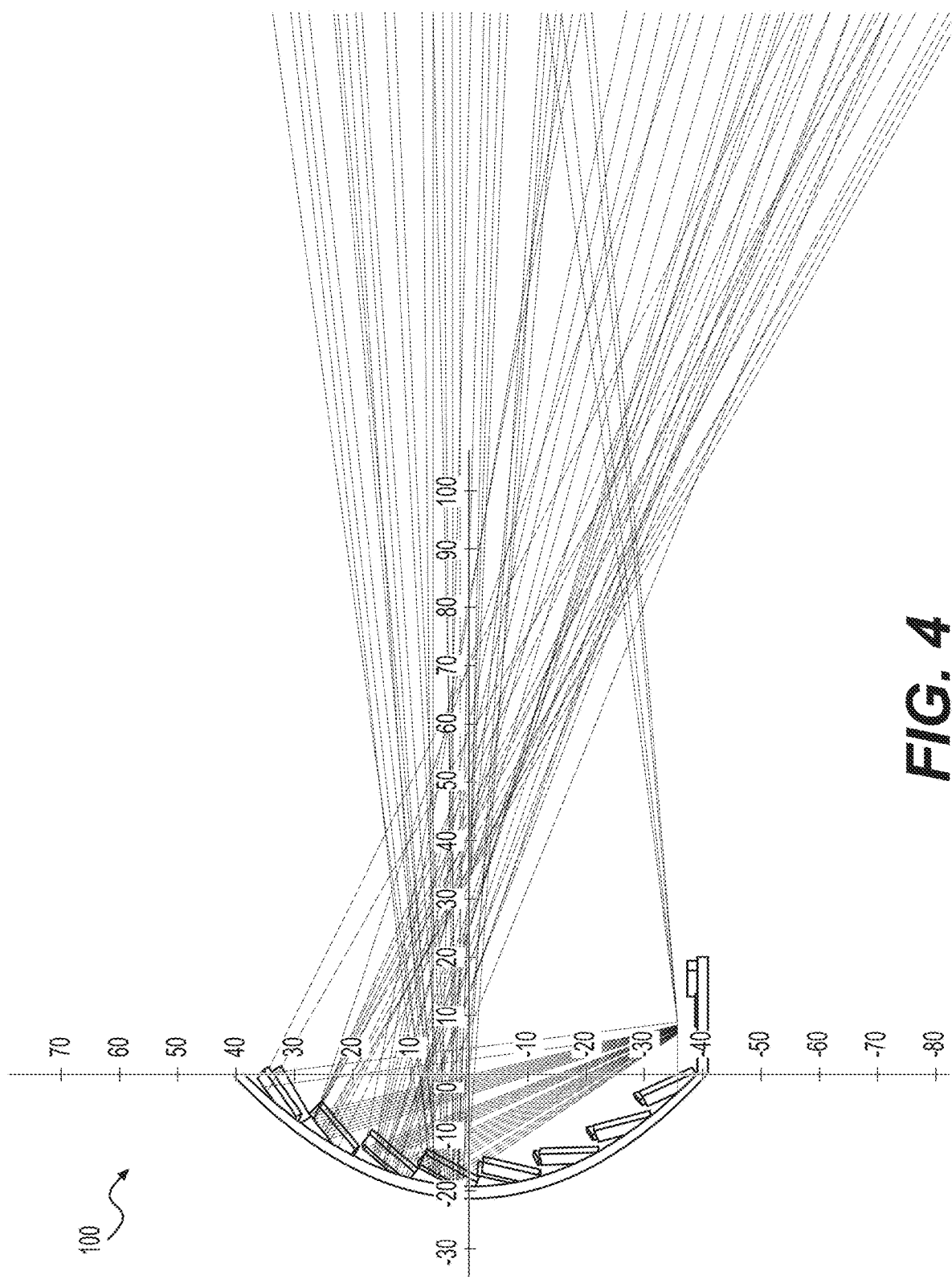
FIG. 4 is a side view of the dynamic segmented-reflector system showing light pattern formation according to the disclosed embodiments.

FIG. 4 shows a side view similar to FIG. 2. That is, FIG. 4 shows the dynamic segmented-reflector 100 outwardly reflects the light emitted from the light source 200 past the light source 200 in order to form a light pattern.

Reflector Facets

FIG. 1 shows that the dynamic segmented-reflector 100 includes a plurality of reflector facets 300. The plurality of reflector facets 300 include at least one mirrored surface that faces the light source 200. Each of the plurality of reflector facets 300 are aligned along the reflector sidewall substrate 110 of the dynamic segmented-reflector 100. As noted above, the reflector facets 300 are grown on the reflector sidewall substrate 110, which acts as a substrate. The growth of the reflector facets 300 occurs during the formation of a MEMS, as will be understood by one skilled in the art. In some embodiments, the plurality of reflector facets 300 are arranged in a regularly spaced pattern.

For example, FIG. 1 shows that the plurality of reflector facets 300 are arranged in horizontal rows and vertical columns in order to form a matrix. However, the plurality of reflector facets 300 are not limited to a matrix arrangement. Instead, the plurality of reflector facets 300 can be arranged in any configuration, as will be understood by one skilled in the art.

In addition, each of the plurality of reflector facets 300 are configured to reposition, or rotate, on an axis to form different light patterns. After doing so, each of the plurality of reflector facets 300 reflect a portion of the light emitted from the light source 200, which collectively forms a light pattern. For example, FIGS. 2 and 4 show each of the plurality of reflector facets 300 reflecting a portion of the light emitted from the light source 200.

The plurality of reflector facets 300 are directly attached to a plurality of actuators 400 that dynamically move each of the plurality of reflector facets 300. For example, FIG. 3 shows that each of the plurality of reflector facets 300 is attached to one of the plurality of actuators 400. Each of the plurality of actuators 400 attach the plurality of reflector facets 100 to the reflector sidewall substrate 110 of the dynamic segmented-reflector 100. The type and configuration of the actuators 400 is not particularly limited such that the dynamic movement of the plurality of reflector facets 300 may be achieved.

Although FIG. 3 shows a single actuator 400 per reflector facet 300, the dynamic segmented-reflector 100 is not limited to this arrangement. For example, the dynamic segmented-reflector 100 includes, in some embodiments, a single actuator 400 for more than one reflector facets 100. The manner in which the reflector facets 300 is grown on the substrate (i.e., reflector sidewall substrate 110) will determine the structure of the actuators 400 in some embodiments, as will be understood by one skilled in the art.

As an additional example, the dynamic segmented-reflector 100 may include two actuators 400 per row of the plurality of reflector facets 300. An embodiment with this arrangement also controls the plurality of reflector facets 300 to form different light patterns.

FIG. 3 shows that the plurality of reflector facets 300 have a flat, rectangular shape. FIG. 3 also shows that each of the plurality of reflector facets 300 are more flat than the reflector sidewall substrate 110 of the dynamic segmented-reflector 100. However, the shape of the plurality of reflector facets 300 is not limited to a rectangular shape or a flat shape. For example, the plurality of reflector facets 300, in some embodiments, are shaped as a hexagon or a circle. In other embodiments, the plurality of reflector facets 300 curve along with the curvature of the reflector sidewall substrate 110.

Light Source

The dynamic reflector system also includes a light source 200. As mentioned above, the light source 400 emits light towards the dynamic segmented-reflector 100. FIGS. 1-4 show the light source 400 installed on a circuit board 700. Although FIGS. 1-4 show the light source 400 installed in a particular position, the light source 400 is not limited to this position, as will be understood by one skilled in the art.

The light source 400 can be any type of element that emits light. For example, the light source 400 may be a light emitting diode ("LED"). The light source 400 may include a plurality of LEDs in an LED array. In other embodiments, the light source 400 may be a gas-based light source or a filament-based light source.

FIG. 1 shows that the circuit board 700 attaches to an exterior edge 130 of the dynamic segmented-reflector 100. Specifically, FIG. 1 shows that the light source 400 attaches to the bottom of the dynamic segmented-reflector 100. However, the light source 400 may be installed in another position.

For example, the light source 200 may be installed, in some embodiments, directly in front of the center portion 120 of the reflector sidewall substrate 110. In other embodiments, the light source 200 attaches to a side or a top of the reflector sidewall substrate 110.

Control Mechanism

As mentioned above, the dynamic reflector system of the present disclosure is a type of MEMS that allows dynamic movement/adjustment of each of the plurality of reflector facets 300 to form different light pattern arrangements. The MEMS of the dynamic reflector system also receives and responds to different signals and stimuli, such as the detection of oncoming traffic in some embodiments.

FIG. 1 shows that the circuit board 700 includes a light sensor 500 and a controller 600. Although FIG. 1 shows the light sensor 500 attached to the circuit board 700, the light sensor 500 is not limited to being attached to the circuit board 700, as will be understood by one skilled in the art. The circuit board 700 or control 600 may also include a separate memory unit and/or an integrated memory unit. The controller 600 is electrically connected to the reflector sidewall substrate 110 (i.e., a substrate) and adjusts the plurality of reflector facets 300 of the dynamic segmented-reflector 100. In particular, the controller 600 is configured to actuate the plurality of reflectors 300 through the reflector sidewall substrate 110 and actuators 400 in order to form the different light patterns. Thus, the controller 600 ultimately controls the plurality of reflector facets 300 of the dynamic segmented-reflector 100 in some embodiments.

The controller 600, in some embodiments, controls the plurality of reflector facets 300 to form one of a plurality of predetermined arrangements stored on the memory unit. The predetermined arrangements include, for example, a low beam arrangement, a high beam arrangement, a fog beam arrangement, and a spread-high-beam arrangement as well as other arrangements to display entertaining light patterns (such as emoticons or trademarks). The predetermined arrangements will be discussed in greater detail below in reference to the light patterns.

The circuit board 700 also includes at least one light sensor 500, as shown in FIG. 1. The light sensor 500 detects the light emitted from oncoming traffic. The light sensor 500 is electrically connected to the controller 600, and configured to transmit a signal to the controller 600 to indicate the detection of oncoming traffic. This allows the controller 600 to change the arrangement of the plurality of reflector facets 600 in response to detected stimuli (i.e., signals), such as oncoming traffic.

For example, if the plurality of reflector facets 300 of the dynamic segmented-reflector 100 are arranged in a high beam pattern arrangement while the light sensor 500 detects oncoming traffic, the controller 600 can adjust the plurality of reflector facets 300 to form a spread-light-high-beam pattern arrangement.

Note that the terms module, control module, and controller refer to one or more of the following: an application specific integrated circuit (ASIC), an electronic circuit, a processor (shared, dedicated, or group) and memory that execute one or more software or firmware programs, a combinational logic circuit, or other suitable components that provide the described functionality.

Light Patterns & Arrangements of the Reflector Facets

The dynamic segmented-reflector 100 is configured to form different light patterns, as mentioned above. Specifically, the controller 600 is configured to actuate each of the plurality of reflector facets 200 on the substrate of the reflector sidewall 100. Thus, the controller ultimately adjusts each of the respective plurality of reflector facets 300 to form different light patterns.

Figure 5:
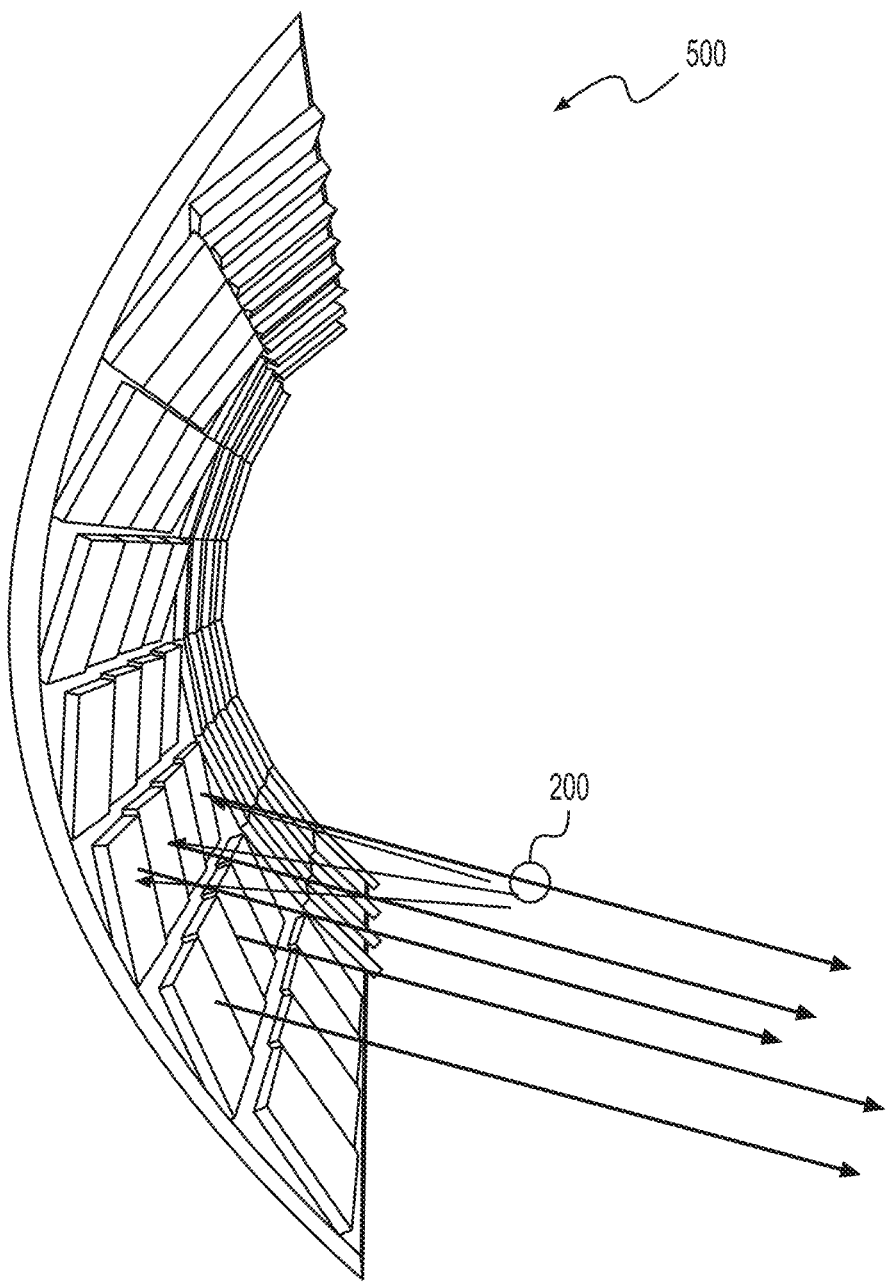
FIG. 5 is a side view of the dynamic segmented-reflector system showing low beam light pattern formation according to the disclosed embodiments.

FIG. 5 shows a low beam arrangement 500 of the plurality of reflector facets 300 that results in a low beam light pattern. As shown in FIG. 5, the light source 200 emits lights toward the plurality of reflector facets 300. The plurality of reflector facets 300 are arranged to outwardly reflect the emitted light to form a low beam light pattern. That is, the plurality of reflector facets 300 direct light below the horizon.

Figure 6:
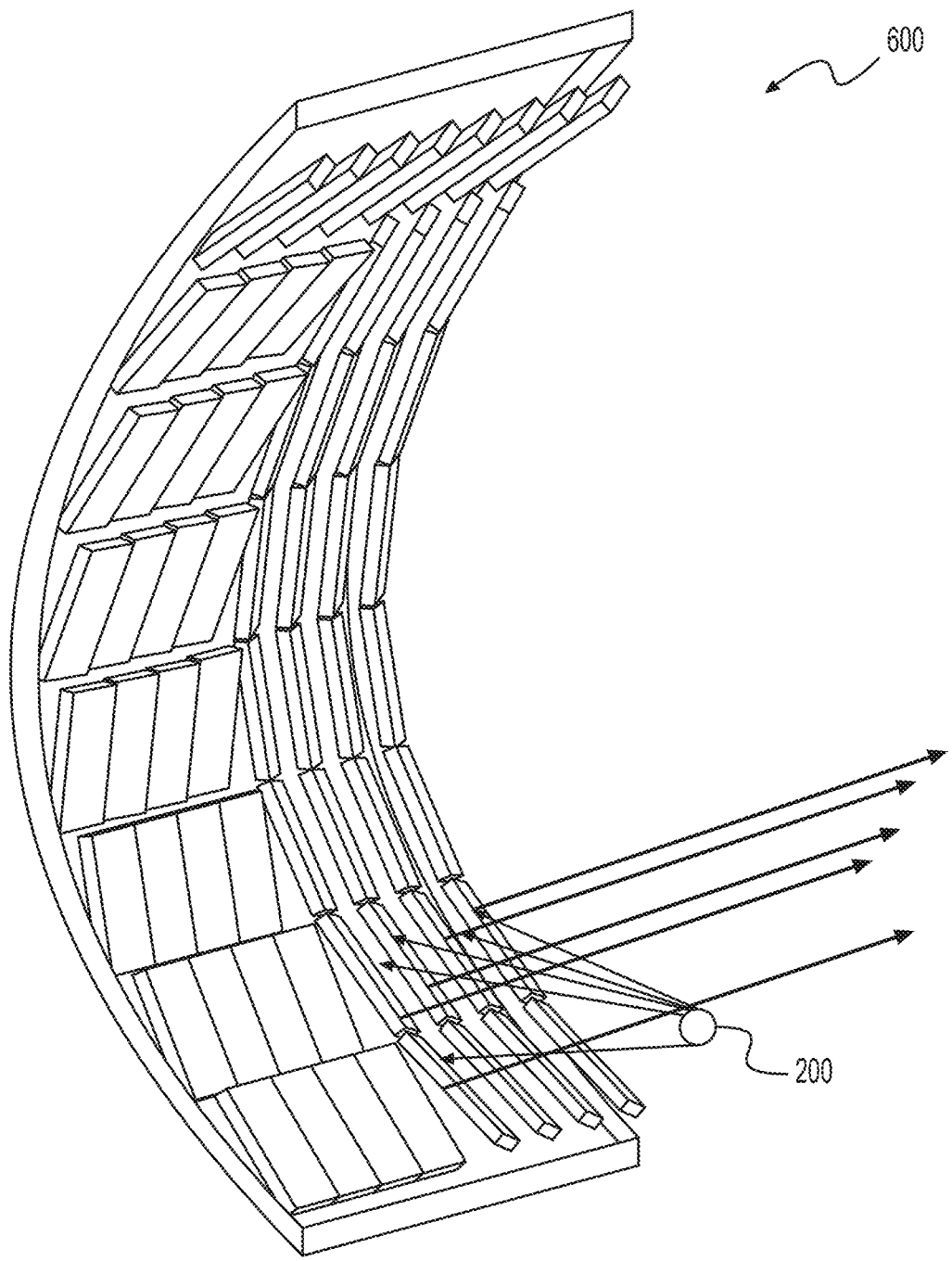
FIG. 6 is a side view of the dynamic segmented-reflector system showing high beam light pattern formation according to the disclosed embodiments.

FIG. 6 shows a high beam arrangement 600 of the plurality of reflector facets 300 that results in a high beam light pattern. As shown in FIG. 6, the light source 200 emits light toward the plurality of reflector facets 300. The plurality of reflector facets 300 are arranged to outwardly reflect the emitted light to form a high beam light pattern. That is, the plurality of reflector facets 300 direct light above the horizon.

Figure 7:
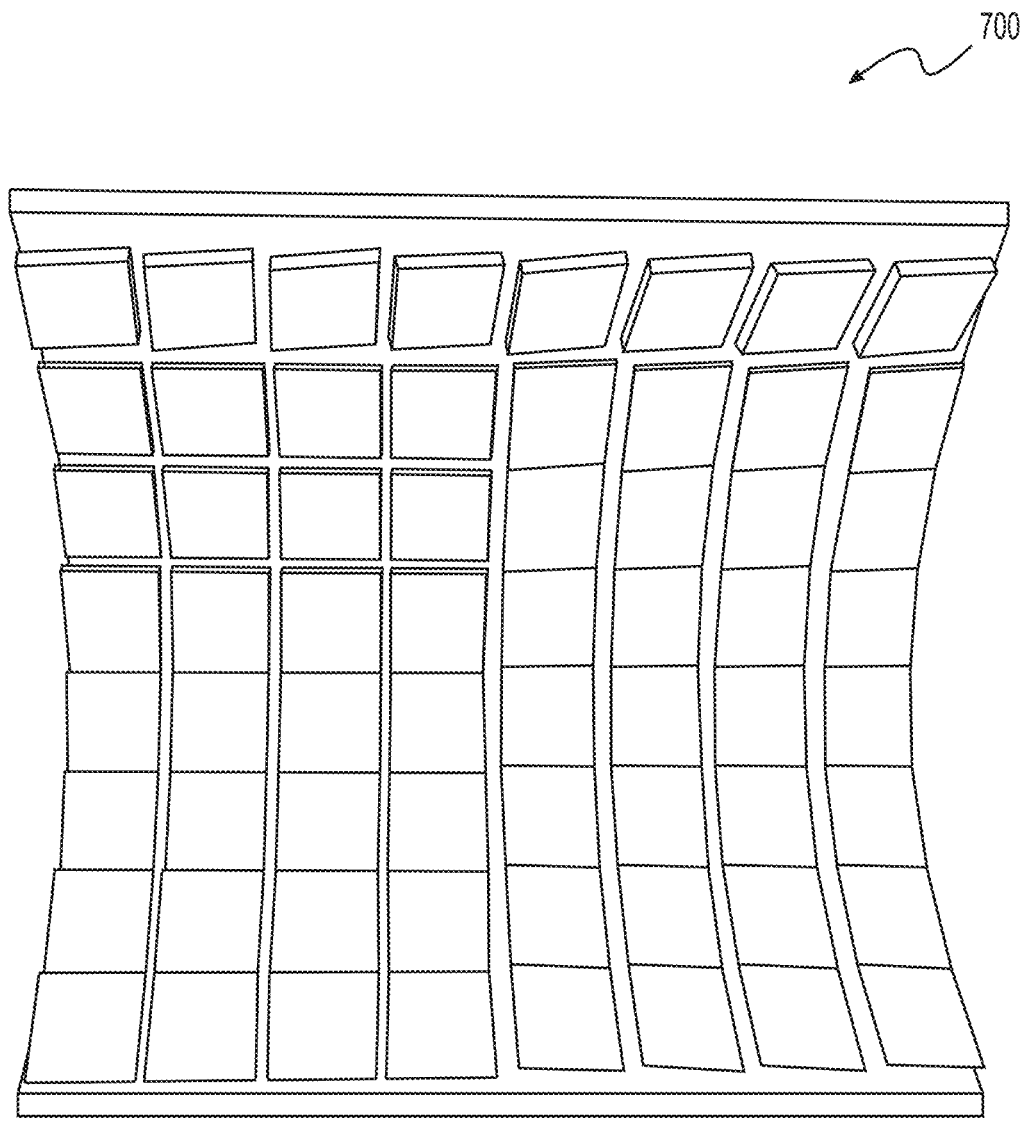
FIG. 7 is a front view of the dynamic segmented-reflector system according to the disclosed embodiments.

FIG. 7 shows a front view of the dynamic segmented-reflector 100. As shown in FIG. 7, the reflector facets 300 of the dynamic segmented-reflector 100 may be dynamically moved to different arrangements. For example, FIG. 7 shows an arrangement 700 in which different regions of the plurality of reflector facets 300 are in different positions.

Figure 8:
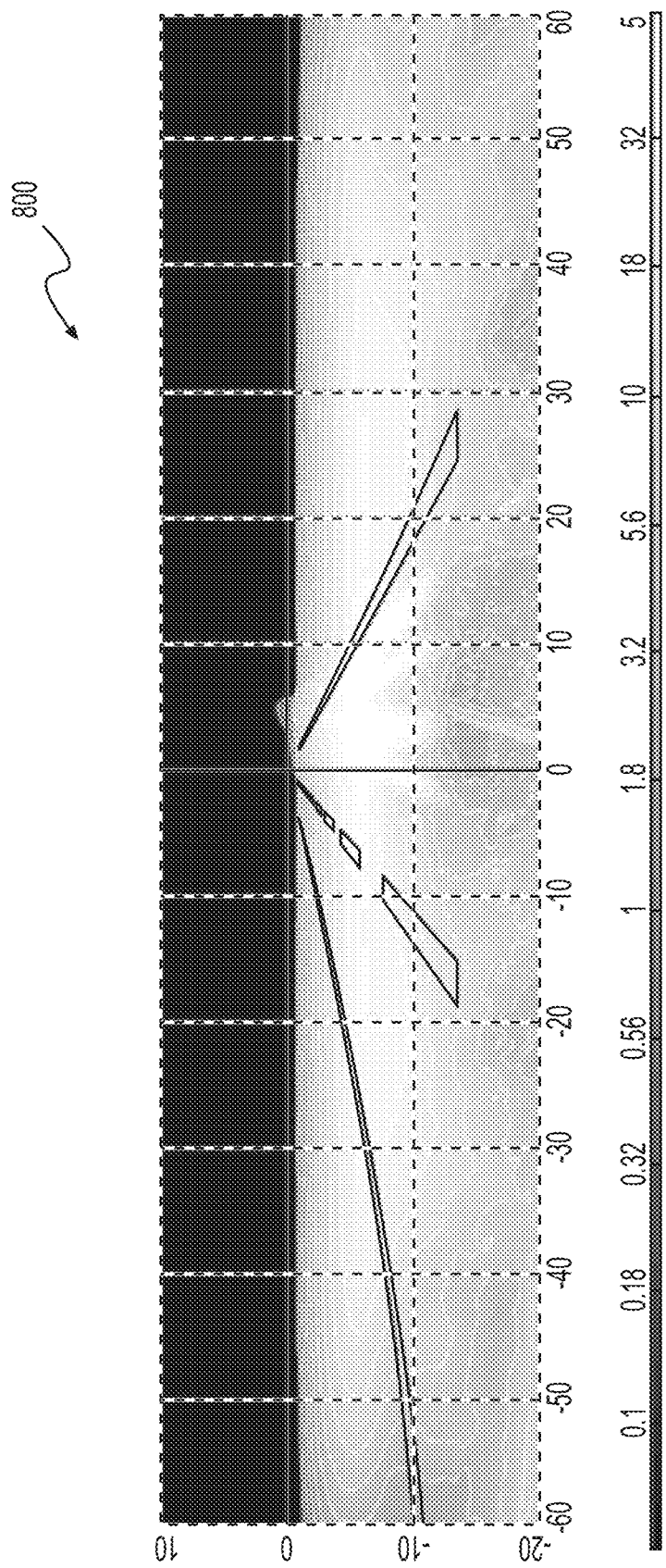
FIG. 8 is an emission profile of the dynamic segmented-reflector system according to the disclosed embodiments.
Figure 9:
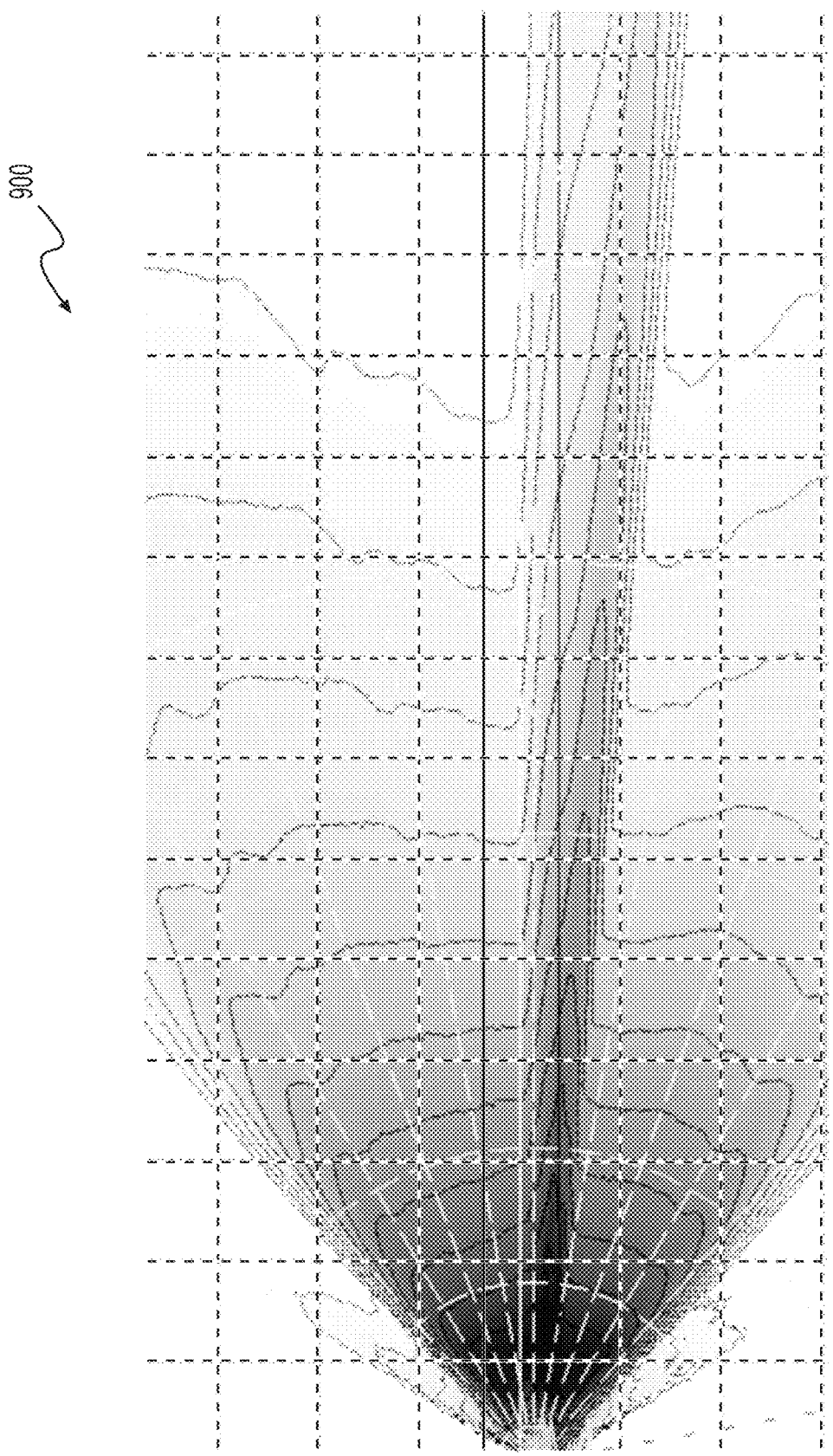
FIG. 9 is an overhead view of the emission profile shown in FIG. 8 of the dynamic segmented-reflector system according to the disclosed embodiments.

FIG. 8 shows an emission profile 800 of the dynamic segmented-reflector 100 on a road located in front of the viewpoint of an automobile. As shown in FIG. 8, the dynamic segmented-reflector 100 emits light in a pattern that illuminates a roadway at least as effectively as a conventional headlamp. FIG. 8 also shows a scale for light intensity, as an example. The units of the scale shown in FIG. 8 are candela per square meters (i.e., $cd/m^2$). However, this example of luminance intensity is merely provided as an example, and the dynamic segmented-reflector 100 is not limited to the light intensities shown in FIG. 8. FIG. 9 shows a top view of the emission profile 900 that results from the dynamic segmented-reflector 100.

Conclusion

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A reflector for a vehicle headlamp, comprising:
   a curved reflector sidewall substrate that outwardly extends from a center portion to form a peripheral edge and that includes a concave surface and a convex surface opposite to the concave surface, the convex surface is connected to the concave surface by the peripheral edge;
   a planar circuit board that extends perpendicular to the curved reflector sidewall substrate;
   a light source that is located on the planar circuit board adjacent to the peripheral edge of the curved reflector sidewall substrate and that emits light toward the curved reflector sidewall substrate; and
   a plurality of reflector facets that outwardly extend from only the concave surface of the curved reflector sidewall substrate, that include at least one mirrored surface that faces the light source, that are configured to reflect light to form a plurality of patterns, and that are configured to adjust to form the plurality of light patterns.

2. The reflector according to claim 1, further comprising a controller electrically that is connected to at least one of the curved reflector sidewall substrate and the plurality of reflector facets and that is configured to adjust the plurality of reflector facets to form a different light pattern of the plurality of light patterns.

3. The reflector according to claim 2, further comprising a light sensor connected to the controller, configured to detect light from oncoming traffic, and transmit a detected oncoming traffic signal to the controller in response to detecting the light from oncoming traffic, wherein
   the controller is further configured to
      actuate the plurality of reflector facets to form a first light pattern, and
      actuate the plurality of reflector facets to form a spread light pattern arrangement in response to the detected oncoming traffic signal of the light sensor.

4. The reflector according to claim 2, wherein
   the controller is configured to
      actuate the plurality of reflector facets to form a first light pattern, and
      actuate the plurality of reflector facets to switch from a first light pattern to a second light pattern different from the first light pattern.

5. The reflector according to claim 2, wherein
   the controller is configured to actuate the plurality of reflectors to form at least one of a high beam pattern, a low beam pattern, a fog beam pattern, a turn signal patter, and a daytime running lamp pattern.

6. A method for controlling a dynamic reflector comprising:
   adjusting a plurality of reflector facets grown on only a concave surface of a curved reflector sidewall substrate of a dynamic segmented-reflector to form a first light pattern arrangement of the plurality of reflector facets from light emitted from a light source on a planar circuit board located perpendicular to the curved reflector sidewall substrate; and
   adjusting the plurality of reflector facets grown on the curved reflector sidewall substrate of the dynamic segmented-reflector to form a second light pattern arrangement of the plurality of reflector facets different from the first light pattern arrangement, wherein the curved reflector sidewall of the dynamic segmented-reflector includes a convex surface opposite to the concave surface, the convex surface of the curved reflector sidewall is connected to the concave surface by a peripheral edge.

7. A method for controlling a dynamic reflector comprising:

adjusting an arrangement of a plurality of reflector facets grown on only a concave surface of a curved reflector sidewall substrate of a dynamic segmented-reflector to form a first light pattern arrangement from light emitted from a light source on a planar circuit board adjacent to the curved reflector sidewall substrate;

detecting oncoming traffic via a light sensor;

transmitting a signal to a controller that indicates the detection of oncoming traffic in response to the detection of oncoming traffic; and adjusting the arrangement of the plurality of reflector facets grown on the curved reflector sidewall substrate of the dynamic segmented-reflector to form a second light pattern arrangement different from the first light pattern arrangement that spreads emitted light of the dynamic segmented-reflector away from oncoming traffic, wherein the curved reflector sidewall substrate of the dynamic segmented-reflector includes a convex surface opposite to the concave surface, the convex surface of the curved reflector sidewall substrate is connected to the concave surface by a peripheral edge.

* * * * *